United States Patent [19]
Kirkendoll

[11] Patent Number: 5,826,042
[45] Date of Patent: Oct. 20, 1998

[54] PORTABLE COMPUTER DOCKING STATION WITH MODULE CONNECTION REPLICATOR

[75] Inventor: Michael Kirkendoll, Houston, Tex.

[73] Assignee: Compaq Computer Corporation, Houston, Tex.

[21] Appl. No.: 692,838

[22] Filed: Aug. 2, 1996

[51] Int. Cl.⁶ .............................. G06F 1/16; G06F 13/00; H05K 7/10
[52] U.S. Cl. .......................... 395/281; 361/686; 361/671
[58] Field of Search .................................. 395/281, 882, 395/309, 821, 671; 361/683, 686

[56] References Cited

U.S. PATENT DOCUMENTS

| | | | |
|---|---|---|---|
| 5,030,128 | 7/1991 | Herron et al. | 439/372 |
| 5,052,943 | 10/1991 | Davis | 439/357 |
| 5,265,238 | 11/1993 | Canova, Jr. et al. | 395/651 |
| 5,283,714 | 2/1994 | Tsai et al. | 361/683 |
| 5,290,178 | 3/1994 | Ma | 439/652 |
| 5,313,596 | 5/1994 | Swindler et al. | 395/281 |
| 5,323,291 | 6/1994 | Boyle et al. | 361/686 |
| 5,347,425 | 9/1994 | Herron et al. | 361/686 |
| 5,377,357 | 12/1994 | Nishigaki et al. | 395/281 |
| 5,396,400 | 3/1995 | Register et al. | 361/686 |
| 5,411,416 | 5/1995 | Balon et al. | 439/639 |
| 5,450,271 | 9/1995 | Fukushima et al. | 361/686 |
| 5,457,785 | 10/1995 | Kikinis et al. | 395/308 |
| 5,463,742 | 10/1995 | Kobayasi | 395/281 |
| 5,477,415 | 12/1995 | Mitcham et al. | 361/686 |
| 5,488,572 | 1/1996 | Belmont | 395/882 |
| 5,493,542 | 2/1996 | Odelid | 368/10 |
| 5,497,490 | 3/1996 | Harada et al. | 395/653 |
| 5,526,493 | 6/1996 | Shu | 395/281 |
| 5,535,093 | 7/1996 | Noguchi et al. | 361/686 |
| 5,579,528 | 11/1996 | Register | 395/671 |
| 5,600,800 | 2/1997 | Kikinis et al. | 395/281 |
| 5,625,829 | 4/1997 | Gephard et al. | 395/284 |
| 5,640,302 | 6/1997 | Kikinis | 361/687 |
| 5,642,517 | 6/1997 | Shirota | 395/750.08 |
| 5,666,495 | 9/1997 | Yeh | 395/281 |
| 5,668,977 | 9/1997 | Swanstrom et al. | 395/500 |
| 5,687,060 | 11/1997 | Ruch et al. | 361/686 |
| 5,694,292 | 12/1997 | Paulsel et al. | 361/686 |

*Primary Examiner*—Gopal C. Ray
*Attorney, Agent, or Firm*—Robert Groover; Betty Formby; Matthew S. Anderson

[57] ABSTRACT

A portable computer docking station in which the computer is inserted vertically into a vertical slot. An additional slot receives modular accessories (such as a CD drive, floppy disk drive, or extra battery) to be inserted. Connectors in the vertical slot provide power to the computer, and provide connection to external display and user input devices, and also provide electrical connection from the computer to whichever module is in the additional slot, and also provides charging if the additional module is a battery.

30 Claims, 3 Drawing Sheets

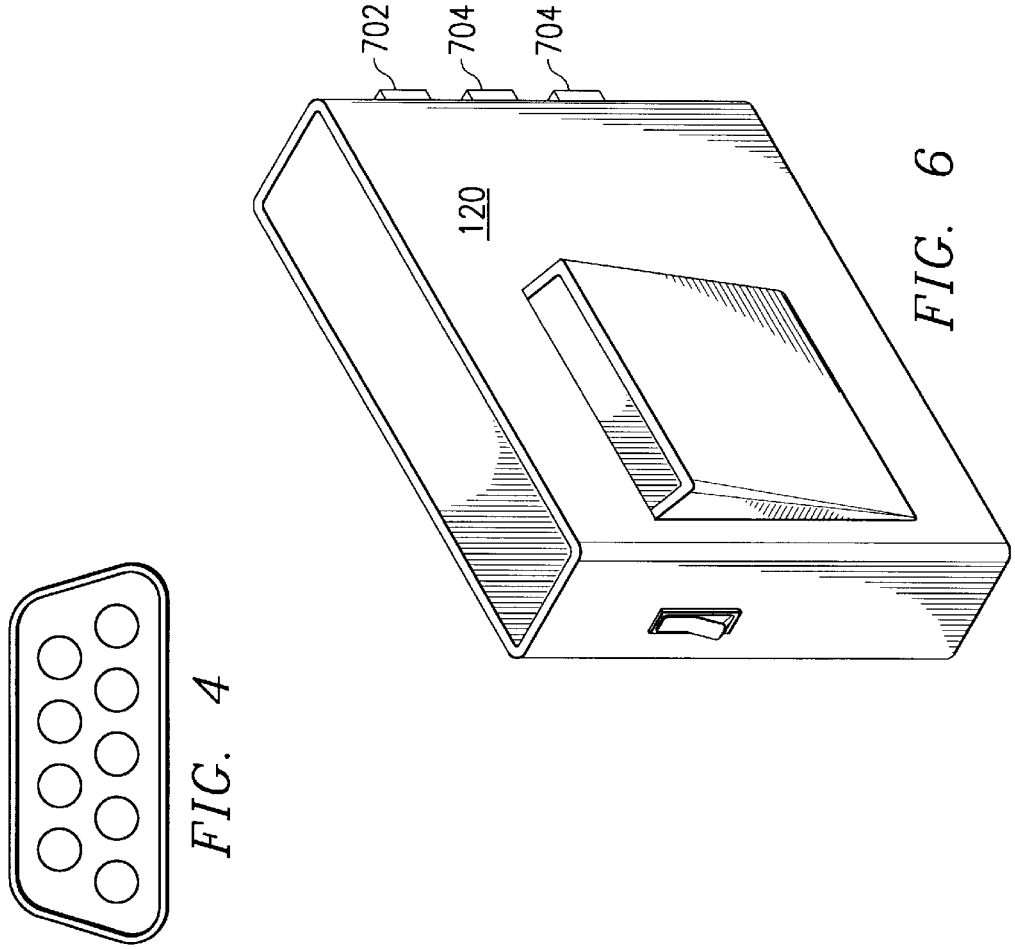
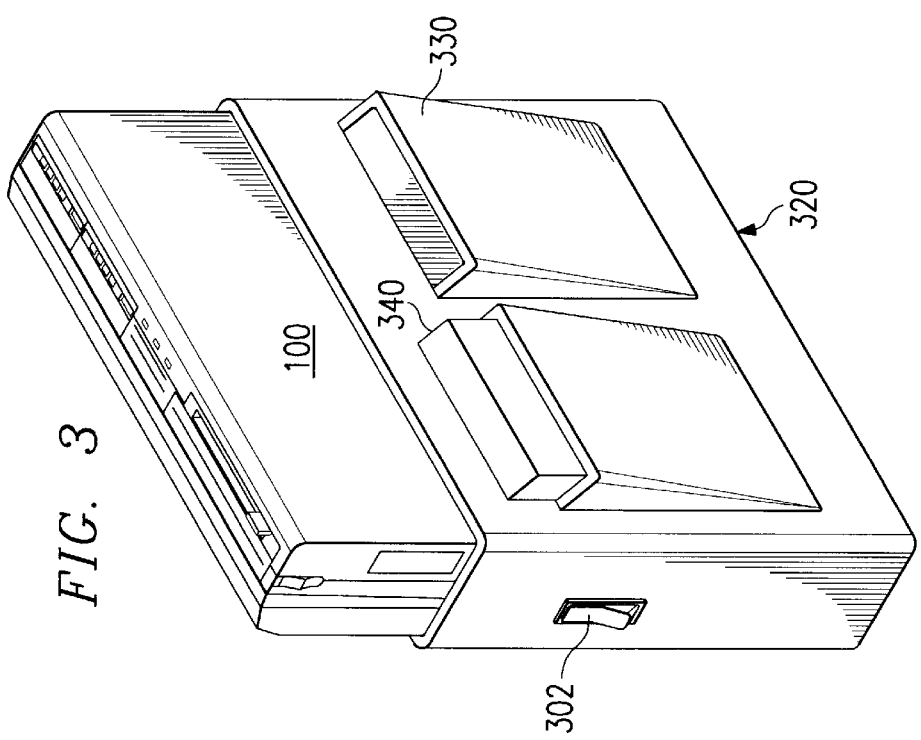

PORTABLE COMPUTER DOCKING STATION WITH MODULE CONNECTION REPLICATOR

BACKGROUND AND SUMMARY OF THE INVENTION

The present invention relates to docking stations into which a small portable computer, such as a "notebook" computer, can be inserted.

1. Background: Docking Stations

Docking stations are now often used to permit a portable computer to be easily connected to the better-quality display and input devices of a desktop work station. Thus a computer user can simply insert his portable computer into the docking station when he returns to his desk, and will thus be able to use the same hardware and software configuration at his workstation and on the road. Such docking stations will commonly include interfaces to power supply, CRT display, external keyboard and pointing device, and may also include interfaces to a network and to a CD ROM, audio amplifier, or other bulky accessories. The accessories used on the desktop, of course, are not constrained by the space, weight, and ruggedness requirements of portable use, and thus can be optimized to provide superior ergonomics.

Terminology: in the present application the term "docking station" will be used to refer to a station which permits insertion of a small portable computer in its closed position, and allows use of a desktop-quality user interface hardware (display, keyboard, pointing devices) with the microprocessor(s) and other central components of the portable computer. The term "port replicator" will be used to refer to simpler devices (like that sold for use with the Compaq LTE5000), which still require the user to use the portable computer's built-in interface hardware. (For example, with the Compaq LTE5000 the notebook computer is opened up to use its display and keyboard.)

Convenience of docking and undocking is a key objective in docking stations, and therefore the electrical connections in the docking station are often designed to provide a very quick connection to the portable computer. Typically the portable computer does not have to be opened up or run through its startup procedure, but is simply inserted into its docking bay.

The docking station can be thought of as a quick-connect socket for accessing the data, programs and environment configuration in a portable computer, from the I/O devices of an ergonomically optimized stationary computer.

A substantial body of literature exists regarding docking stations and their use. See, for example, the following patents, all of which are hereby incorporated by reference: 5,535,093; 5,526,493; 5,497,490; 5,493,542; 5,488,572; 5,477,415; 5,463,742; 5,457,785; 5,450,271; 5,411,416; 5,396,400; 5,377,357; 5,347,425; 5,323,291; 5,313,596; 5,290,178; 5,313,596; 5,290,178; 5,283,714; 5,265,238; 5,052,943; and 5,030,128.

2. Background: Physical Size of Portable Computers

Portable notebooks are driven by a desire to reduce size and weight. However there are certain minimums on the size and weight of a full-function portable computer, due to the necessary size of the keyboard and display. Similarly, there is a lower limit on weight due to the requirement for battery operation. While battery technology continues to advance, it is a much older technology, and a much more mature technology, than most areas of electronic technology. The advances which are achieved are therefore incremental, and no drastic shifts in energy content per unit weight appear likely. Typical weights for a complete useable travelling notebook computer run from around seven pounds down to less than four pounds. The dominating factor is battery size. Since battery energy densities are advancing relatively slowly, it is very difficult to reduce weight further for a given minimum operating time. A full-function operating time of at least an hour and a half is absolutely necessary, and an operating time of two or three hours or more is highly desirable. While advances in energy efficiency of the basic components continue to occur, such advances too are incremental (although continuous) rather than revolutionary. Thus, the marketplace will tend to drive a tradeoff between acceptable total weight and required minimum lifetime.

Thus the weight of a small portable computer is not insignificant, and will probably continue to be in the range of at least several pounds. In manipulating an object of this size, ergonomics is a consideration. The present invention provides an advance in ergonomics with small portable computers, which can be used to improve user comfort and/or convenience, and/or to provide better ergonomic matching to the articulation of the human wrist, elbow, and shoulder joint.

3. Background: Modular Construction of Portable Computers

Due to the extreme constraints on size and power consumption in portable computers, an increasingly popular option has turned out to be the use of portable computers which have multiple modules. In such implementations, detachable modules will be used for functions, such as floppy disk drive, CDROM, additional battery module, or even hard disk drive, which are not necessarily used all the time. By making these modules interchangeable, the minimum volume of the functional machine is reduced, without totally precluding the use of those functions which may be desired for occasional use.

Innovative Docking System

The present application discloses a portable computer docking system in which the computer is inserted vertically into a first docking location (preferably shaped as a vertical slot). An additional slot receives modular accessories, such as a CD drive, floppy disk drive, or extra battery. Connectors in the vertical slot provide the computer with: power; connection to external display and user input devices; and electrical connection to whichever module is in the additional slot. Connectors in the additional slot provide data communication between the additional module and the computer, and also provide charging if the additional module is a battery.

Thus, with a portable computer which has interchangeable modules for road use, as is often the case in modern portable computers, a detached module which is not currently mounted in the computer itself can be inserted into its own slot in the innovative docking station. Thus, for example, the slot can be designed to accept an additional battery unit, so that the spare battery can be recharged while the computer is being used at the user's desktop. Connectors can be provided for a detachable accessory, such as a CD rom drive, to be used while the notebook is docked at the desk, without changing the physical configuration of the computer itself.

The construction of this unit is fairly simple. Many of the electrical connections are quite conventional, but the disclosed innovative systems provide new functionality as well. Specifically, the disclosed systems not only provide display, power, and user input connections to the docked computer (as in conventional docking systems), but also provide electrical connections between the docked computer and the secondary docking location, and/or provide a battery charging output in the secondary docking location.

Optionally, the innovative docking station can include two or more of the additional slots. Optionally one slot can be reserved for battery charging, and another used to provide a full-featured module connection.

Preferably the docking station includes a power switch which is connected to disable at least some operations of the docked computer.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 3 shows an alternative docking station with two side pockets for separate insertion of two modules.

FIG. 4 shows a connector configuration which is used, in the larger recess in the docking station, to form electrical connections upon insertion of the notebook computer.

FIG. 6 shows how the wiring connections are led out from the back of the docking station of FIG. 1, in the presently preferred embodiment.

DETAILED DESCRIPTION OF THE PREFERRED EMBODIMENTS

Figure 1:
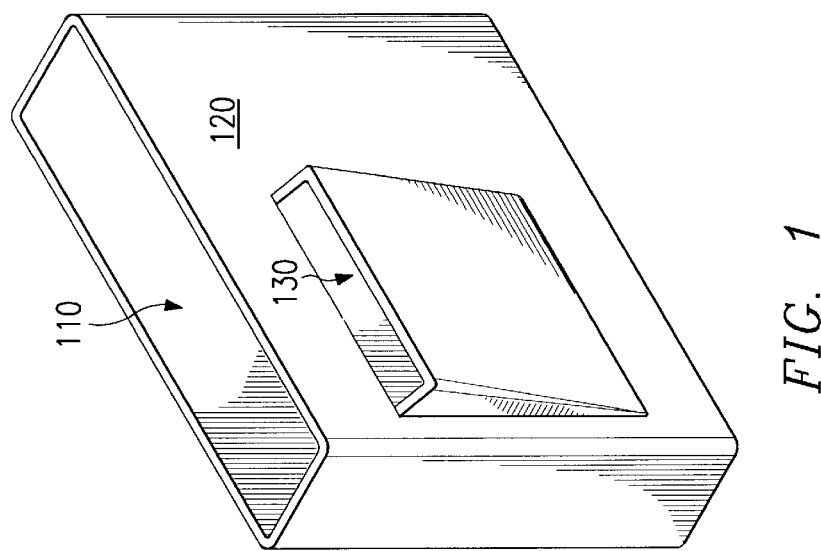
FIG. 1 shows a sample docking station according to one class of inventive embodiments.

The numerous innovative teachings of the present application will be described with particular reference to the presently preferred embodiment (by way of example, and not of limitation), in which:

FIG. 1 shows a sample docking station 120 according to the present invention, with a first docking location 110 for docking the computer itself and one additional docking location 130 on the large side of the docking station 120. (In embodiments where the docking station is mounted on the side of a desk, the additional slot is preferably located on the side which would be away from the desk.)

The portable computer is a notebook or subnotebook in this embodiment, and is preferably inserted into the first docking location 110 at a near-vertical angle (more than 45° from horizontal, and preferably more than 70° from horizontal). The verticality of insertion helps to provide extra force to make a good electrical connection, and to avoid disruption of contacts due to ambient shock (e.g. from a user bumping the desk). Thus the first docking location 110 in a docking station 120 is oriented vertically or near-vertically, and is dimensioned to receive a computer in the closed (transportable) configuration.

The additional docking location 130 is provided for separate insertion of modules, in addition to the main aperture for insertion of the computer itself. The additional docking location 130 is dimensioned to receive one of the detachable modules which also optionally mount into the computer itself.

Figure 2:
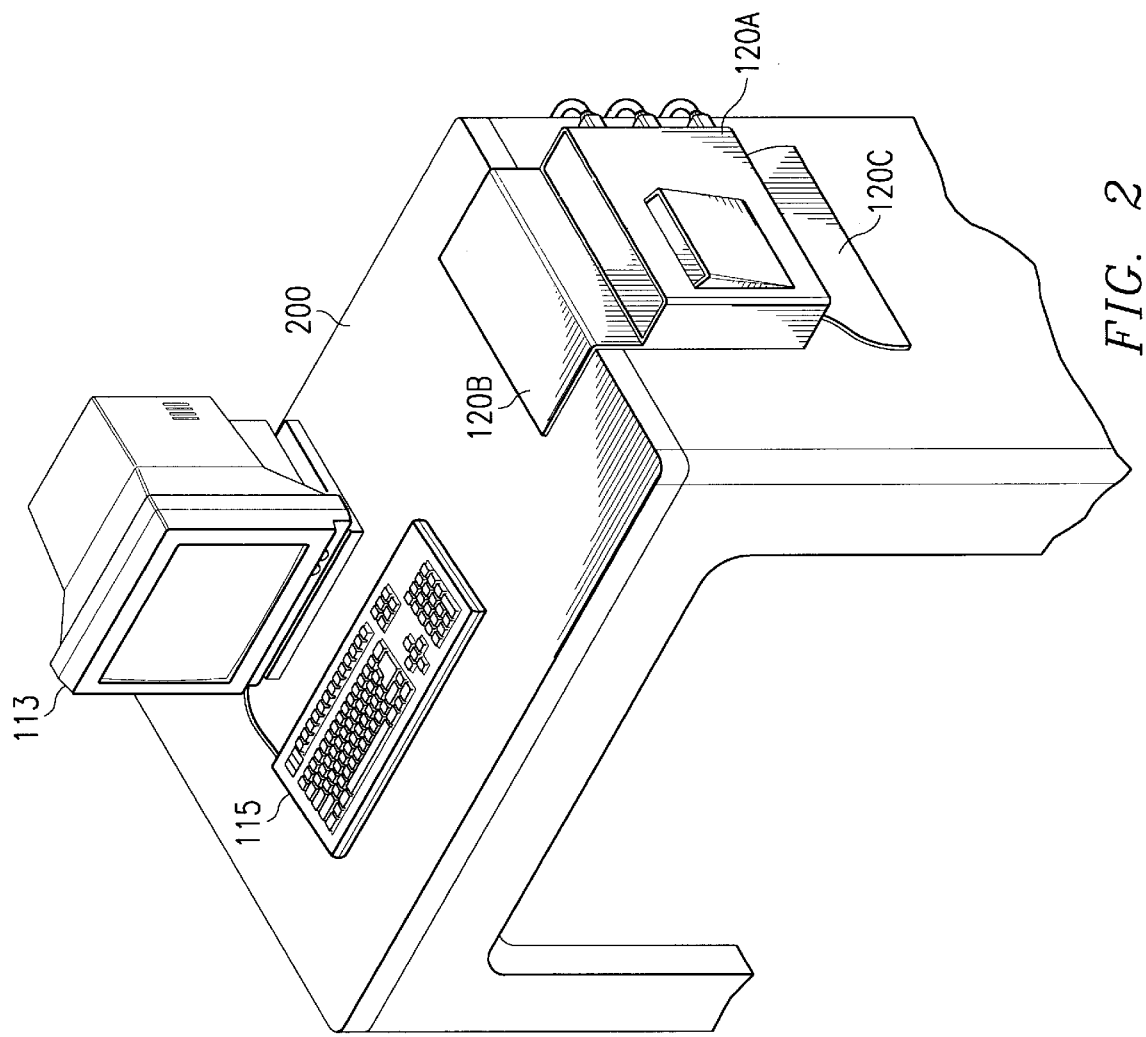
FIG. 2 shows a modified embodiment of the station of FIG. 1 mounted to the right side of a desk.

FIG. 2 shows a modified docking station 120A mounted to the right side of a desk 200. This is advantageous in terms of workplace organization and economics, since it provides docking at an ergonomically convenient height, permits a user to exploit any underutilized space, and does not take up desktop space. Note that, in this preferred embodiment, the docking station 110A is stabilized by a horizontal extension 120B which lies on the surface of the desk, and a vertical extension 120C which extends down along the side of the desk. These extensions provide additional stability when the computer is inserted or withdrawn. The physical attachment to the desk is preferably secured, for example, with screws, nails, or glue. Depending on the design of the desk itself, the mechanical connection between the docking station 120 and the desk may use a horizontal extension of the docking station 120 as shown, or may use a simple attachment to the vertical side of the desk. The cabling shown permits the user to access the portable computer 100 through desktop user interface devices (monitor 113 and keyboard 115, in this example).

FIG. 3 shows an alternative docking station 320 with two additional docking locations 330 for separate insertion of two modules 340. Connectors are included in both additional docking locations 330, and preferably both have the same pin-out and multifunctional capabilities, so that (for example) a battery can be charged in the left pocket while a CDROM player plays in the right pocket, or a battery can be charged in the right pocket while a CDROM player plays in the left pocket, without the user performing any setup operations.

Preferably the docking station 120 includes a power switch 302 (shown in FIGS. 3 and 6) which is connected to disable at least some operations of the docked computer. In the presently preferred embodiment this switch simply interrupts all power to the computer; optionally this switch can be connected so that it interrupts only one power connection to the computer, but does not interrupt power on another connection to the computer, and/or does not interrupt power to the modules additional docking location(s) 130. (For example, these two power connections can be connected, in the computer, so that the main unit is inoperable, but a built-in battery can still be charged.)

FIG. 3 also shows how a computer 100 and a CD player module 340 have been docked in the docking station. The computer 100 has been vertically inserted into the first docking location 110, and the CD player module 340 has been inserted at an angle into one of the two additional docking locations 330.

FIG. 4 shows a connector configuration which is used, in the presently preferred embodiment, in the first docking location 110 in the station 120, to form electrical connections upon insertion of the notebook computer 100 (shown in FIG. 3). In this example this connector is a DB-9 connector which has been modified for zero-insertion-force, but of course various other connectors can be used. Many examples are shown in the literature referenced above.

Figure 5:
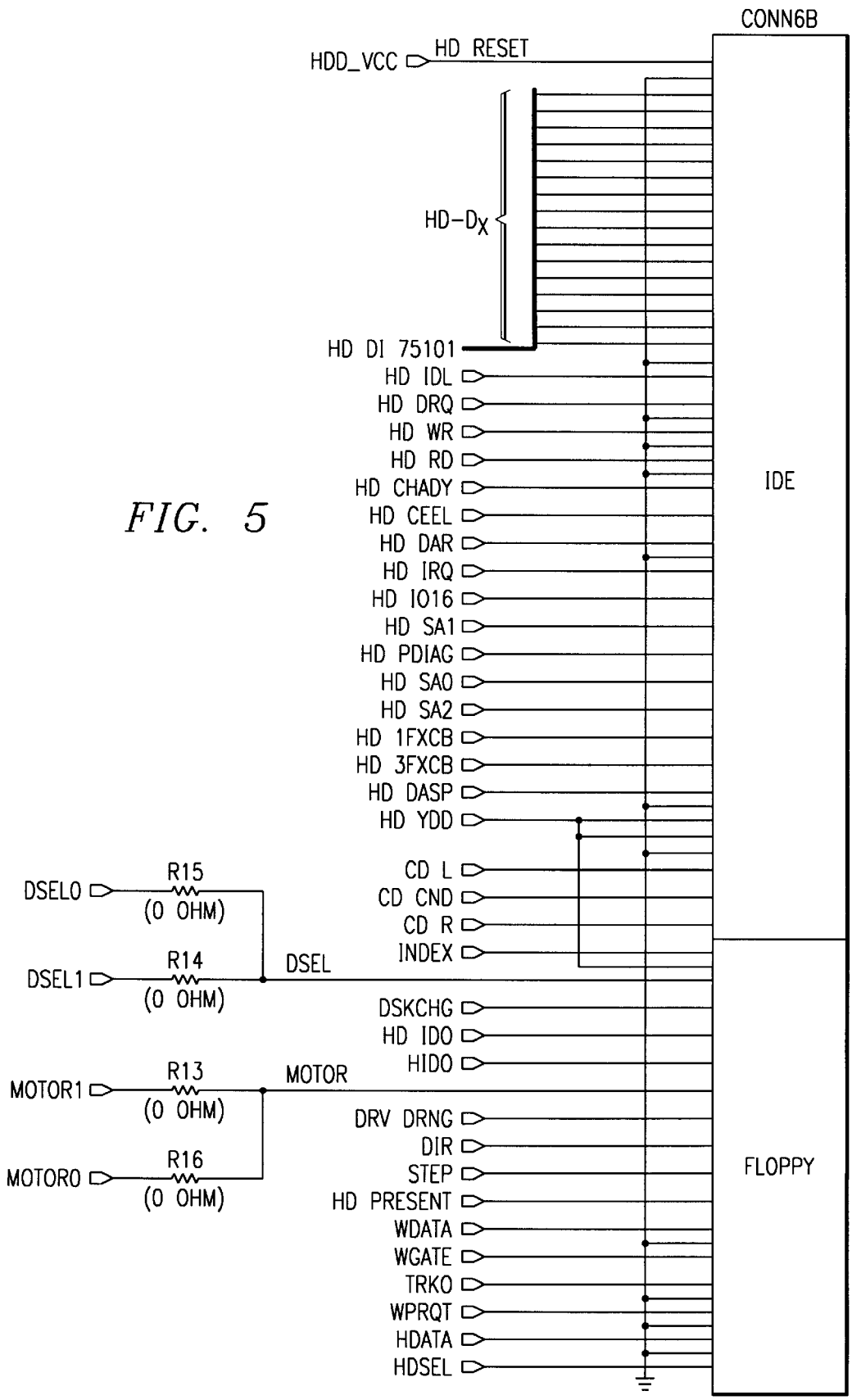
FIG. 5 shows a connector configuration which is used, in the smaller recess in the docking station, to form electrical connections upon insertion of a module.

FIG. 5 shows a connector configuration which is used, in the presently preferred embodiment, in the additional docking location(s) 130 in the docking station 120, to form electrical connections upon insertion of a module.

FIG. 6 shows how the wiring connections are led out from the back of the docking station of FIG. 1, in the presently preferred embodiment. As seen in this Figure, a VGA connector 702, and two PS/2-format connectors 704 for mouse and keyboard, are mounted on the rear face of the side-hung docking station. Of course a wide variety of other connections can be added if desired, as will be readily apparent to those of ordinary skill in the art of docking computer systems.

According to a disclosed class of innovative embodiments, there is provided: a portable computer docking system, comprising: a portable computer including at least one module connector dimensioned to detachably receive, and make electrical contact to, modules having a module connector format, and interface connectors connected to provide external data communications; and a docking station including therein a first docking location dimensioned to receive said portable computer, and at least one additional docking location dimensioned to receive ones of said modules, and first docking connectors including a power connection which provides power to said computer at said first docking location, and data connectors connected to make electrical connection with said interface connectors when said computer is in said first docking location, and connected to provide data communication between said computer and the exterior of said docking station; and additional docking connectors positioned to form electrical connections to a module in said additional docking location, and connected to provide a data connection between said computer and said module through said data connectors and said second docking connectors.

According to another disclosed class of innovative embodiments, there is provided: a portable computer docking system, comprising: a portable computer including at least one module connector dimensioned to detachably receive, and make electrical contact to, modules having a module connector format, and interface connectors connected to provide display signal outputs and to receive user input signals; and a docking station including therein a first docking location dimensioned to receive said portable computer; a plurality of additional docking locations each dimensioned to receive ones of said modules; first docking connectors including a power connection which provides power to said computer at said first docking location, and data connectors connected to make electrical connection with said interface connectors when said computer is in said first docking location, to thereby route said display signal outputs from said computer to an external display, and to route user input signals from a user input device to said computer; and additional docking connectors positioned, in said additional docking location, to form electrical connections to a module inserted therein, and connected to provide a data connection between said computer and said module, through said data connectors and said second docking connectors.

According to another disclosed class of innovative embodiments, there is provided: a portable computer docking system, comprising: a portable computer having interface connectors mounted on a first external surface thereof, and connected to provide display signal outputs and to receive user input signals; a docking station including therein a first docking location dimensioned to receive said portable computer with a vertical direction of insertion, with said first external surface leading; and first docking connectors, positioned to form electrical connections with a portable computer in said first docking location, including a power connection which provides power to said computer at said first docking location, and data connectors connected to route said display signal outputs from said computer to an external display, and to route user input signals from a user input device to said computer.

According to another disclosed class of innovative embodiments, there is provided: a docking station for receiving a portable computer, comprising: a first docking location dimensioned to receive a portable computer, and at least one additional docking location dimensioned to receive detachable modules which can also be attached to and carried with said computer; and first docking connectors, positioned to form electrical connections with a portable computer in said first docking location, including a power connection which provides power to said computer at said first docking location; data connectors connected to route display signal outputs from said computer to an external display, and to route user input signals from a user input device to said computer, and to provide a data interface to said computer in said first location; and additional docking connectors positioned to form electrical connections to a module in said second docking location; wherein said additional docking connectors and said complementary interface connectors are interconnected to provide a digital data path therebetween.

According to another disclosed class of innovative embodiments, there is provided: a docking station for receiving a portable computer, comprising: a first docking location dimensioned to receive said portable computer, and a plurality of additional docking locations each dimensioned to receive ones of said modules; and first docking connectors, positioned to form externally accessible electrical connections with a portable computer in said first docking location, including a power connection which provides power to said computer at said first docking location; data connectors connected to route said display signal outputs from said computer to an external display, and to route user input signals from a user input device to said computer; and additional docking connectors positioned to form electrical connections between said additional connectors and a module in said second docking location.

According to another disclosed class of innovative embodiments, there is provided: a docking station for receiving a portable computer, comprising: a body including therein a first docking location dimensioned to receive said portable computer with only a vertical direction of insertion, said computer having interface connectors mounted on a first external surface thereof, and connected to provide display signal outputs and to receive user input signals; and first docking connectors, positioned to form electrical connections with connectors on said first external surface of a portable computer in said first docking location, including a power connection which provides power to said computer at said first docking location, and data connectors connected to route said display signal outputs from said computer to an external display, and to route user input signals from a user input device to said computer.

According to another disclosed class of innovative embodiments, there is provided: a method of docking a portable computer to user-interface hardware, comprising the steps of: inserting the computer into a body including therein a first docking location dimensioned to receive the computer; wherein first docking connectors are positioned in said body to mate with said computer in said first docking location; and after said step (a.), routing display signal outputs from said computer to an external display, through first docking connectors and complementary interface connectors, and routing user input signals from an external user input device to said computer, through said first docking connectors; and inserting at least one detachable module, which is also insertable into the computer, into at least one additional docking location in said body which includes additional docking connectors which mate with said module; and after said steps (a.) and (c.), performing data communication in at least one direction between the module and the computer through said first docking connectors and said additional docking connectors.

According to another disclosed class of innovative embodiments, there is provided: a method of docking a portable computer to user-interface hardware, comprising the steps of: inserting the computer into a body including therein a first docking location dimensioned to receive the computer; wherein first docking connectors are positioned in said body to mate with said computer in said first docking location; and after said step (a.), routing display signal outputs from said computer to an external display, through first docking connectors and complementary interface connectors, and routing user input signals from an external user input device to said computer, through said first docking connectors; inserting first and second detachable modules, which are both also insertable into the computer, into two additional docking locations in said body which each include respective additional docking connectors which mate with said respective module; wherein said second detachable modules includes a battery; after said steps (a.) and (c.), performing data communication in at least one direction between the first detachable module and the computer through said first docking connectors and said additional docking connectors; and after said step (c.), charging said battery while said second detachable module is positioned in one of said additional docking locations.

According to another disclosed class of innovative embodiments, there is provided: a method of docking a portable computer to user-interface hardware, comprising the steps of: inserting the computer, with a substantially vertical angle of insertion, into a body including therein a first docking location dimensioned to receive the computer; and thereafter routing display signal outputs from said computer to an external display, through first docking connectors, positioned in said body to form electrical connections with a portable computer in said first docking location, and complementary interface connectors which are integral with said computer and which are connected to said first docking connectors when said computer is inserted into said first docking location; routing user input signals from an external user input device to said computer, through said first docking connectors and said complementary interface connectors; and controllably providing power to said computer through said first docking connectors and said complementary interface connectors.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, it is preferable (but not necessary) to have an interchangeable connector footprint for docking ANY module, so that a battery or CD-ROM or floppy drive could all be docked in the same slot.

For example, the exterior of the docking station can optionally also include one or more other connections to provide network interface, PCMCIA expander connections, and/or connectors for PCI or SCSI or other bus formats.

For another example, while the docking location are configured, in the presently preferred embodiment, as slots extending into the docking station, it is also possible to use a more open physical configuration, in which guide rails locate a component with respect to the electrical contact locations.

For another example, the user inputs which are routed to the docked computer can include not only keyboard and pointing device, but also a microphone, video camera, 3-D display, eyeball position tracker, or other input or display devices.

For another example, the described docking station uses simple manual insertion, without a latching or locking device, the disclosed innovations can also be adapted to embodiments with latching or locking devices or with powered insertion. However, one of the advantages of the disclosed innovations is that they reduce the need for powered insertion mechanisms, and hence embodiments with powered insertion are distinctly less preferable.

For another example, the computer is preferably inserted back-end-first, but optionally it can be configured so that the docking connectors are on one of the sides, or even on the front face of the computer. (Indeed the computer does not necessarily have to be shaped as a parallelepiped.)

For another example, the exterior of the docking station can be made of various materials (preferably molded polymer), and can optionally have a customized shape, color, texture, labelling, or composition. The mechanical construction of the docking station can be one-piece, two-piece, or more complex.

For another example, although the data connections to the computer are implemented as actual electrical connections in the presently preferred embodiment, these connections can also be implemented as short-range optical connections (e.g. using one or more phototransistor/LED pairs to provide one or more optically coupled data channels). In this case optical fiber can be used to provide a flexible connection to the adjustable part of the docking station, or alternatively (if the number of optical channels is small) it may be possible to provide optical coupling directly to the fixed part of the docking station.

It should also be noted that the disclosed innovative ideas are not limited to the generation of computers referred to as "notebook" computers, but are also applicable to subnotebooks, palmtops, and other present and future sizes of computers.

What is claimed is:

1. A portable computer docking system, comprising:
   a portable computer including
      at least one module connector dimensioned to detachably receive, and make electrical contact to, modules having a module connector format, and
      interface connectors connected to provide external data communications; and
   a docking station including therein
      a first docking location dimensioned to receive said portable computer, and at least one additional docking location dimensioned to receive one of said modules, and
      first docking connectors including data connectors positioned to make electrical connection with said interface connectors when said computer is in said first docking location, and connected to provide data communication between said computer and the exterior of said docking station; and
      additional docking connectors positioned to form electrical connections to a module in said additional docking location, and connected to provide a data connection between said computer and said module through said data connectors and said additional docking connectors.

2. The system of claim 1, further comprising an external display which is separate from said computer and said docking station, and which is connected to receive display signal outputs from said computer through said interface connectors.

3. The system of claim 1, wherein display signal outputs from said computer are routed through a VGA output connector on the exterior of said docking station.

4. The system of claim 1, wherein said computer is a notebook-sized portable computer.

5. A portable computer docking system, comprising:
a portable computer including
at least one module connector dimensioned to detachably receive, and make electrical contact to, modules having a module connector format, and
interface connectors connected to provide external data communications; and
a docking station including therein
a first docking location dimensioned to receive said portable computer, and at least one additional docking location dimensioned to receive one of said modules, and
first docking connectors including data connectors positioned to make electrical connection with said interface connectors when said computer is in said first docking location, and connected to provide data communication between said computer and the exterior of said docking station; and
additional docking connectors positioned to form electrical connections to a module in said additional docking location, and connected to provide a data connection between said computer and said module through said data connectors and said additional docking connectors;
wherein said computer is capable of being closed, and includes an integral display which is not visible when said computer is closed, and wherein said first docking location is dimensioned to receive said computer only when said computer is closed.

6. The system of claim 1, wherein said computer is configured to provide display signal outputs into said interface connectors, and configured to receive user input signals from said interface connectors.

7. A portable computer docking system, comprising:
a portable computer including
at least one module connector dimensioned to detachably receive, and make electrical contact to, modules having a module connector format, and
interface connectors connected to provide display signal outputs and to receive user input signals; and
a docking station including therein
a first docking location dimensioned to receive said portable computer;
a plurality of additional docking locations each dimensioned to receive one of said modules;
first docking connectors including a power connection which provides power to said computer at said first docking location, and data connectors connected to make electrical connection with said interface connectors when said computer is in said first docking location, to thereby route said display signal outputs from said computer to an external display, and to route user input signals from a user input device to said computer; and
additional docking connectors positioned, in at least one said additional docking location, to form electrical connections to a module inserted therein, and connected to provide a data connection between said computer and said module, through said data connectors and said additional docking connectors.

8. The system of claim 7, further comprising an external display which is separate from said computer and said docking station, and which is connected to receive said display signal outputs from said computer through said interface connectors.

9. The system of claim 7, wherein said display signal outputs are routed through a VGA output connector on the exterior of said docking station.

10. The system of claim 7, wherein said computer is a notebook-sized portable computer.

11. A portable computer docking system comprising:
a portable computer including
at least one module connector dimensioned to detachably receive, and make electrical contact to, modules having a module connector format, and
interface connectors connected to provide display signal outputs and to receive user input signals; and
a docking station including therein
a first docking location dimensioned to receive said portable computer;
a plurality of additional docking locations each dimensioned to receive one of said modules;
first docking connectors including a power connection which provides power to said computer at said first docking location, and data connectors connected to make electrical connection with said interface connectors when said computer is in said first docking location, to thereby route said display signal outputs from said computer to an external display, and to route user input signals from a user input device to said computer; and
additional docking connectors positioned, in at least one said additional docking location, to form electrical connections to a module inserted therein, and connected to provide a data connection between said computer and said module, through said data connectors and said additional docking connector;
wherein said computer is capable of being closed, and includes an integral display which is not visible when said computer is closed, and wherein said first docking location is dimensioned to receive said computer only when said computer is closed.

12. A portable computer docking system, comprising:
a portable computer having interface connectors mounted on a first external surface thereof, and connected to provide display signal outputs and to receive user input signals;
a docking station including therein a first docking location dimensioned to receive said portable computer with a vertical direction of insertion, with said first external surface leading; and
first docking connectors, positioned to form electrical connections with said portable computer in said first docking location, including a power connection which provides power to said computer at said first docking location, and data connectors connected to route said display signal outputs from said computer to an external display, and to route user input signals from a user input device to said computer.

13. The system of claim 12, further comprising an external display which is separate from said computer and said docking station, and which is connected to receive said display signal outputs from said computer through said interface connectors.

14. The system of claim 12, wherein said display signal outputs are routed through a VGA output connector on the exterior of said docking station.

15. The system of claim 12, wherein said computer is a notebook-sized portable computer.

16. A portable computer docking system, comprising:
a portable computer having interface connectors mounted on a first external surface thereof, and connected to provide display signal outputs and to receive user input signals;
a docking station including therein a first docking location dimensioned to receive said portable computer with a vertical direction of insertion, with said first external surface leading; and
first docking connectors, positioned to form electrical connections with said portable computer in said first docking location, including a power connection which provides power to said computer at said first docking location, and data connectors connected to route said display signal outputs from said computer to an external display, and to route user input signals from a user input device to said computer;
wherein said computer is capable of being closed, and includes an integral display which is not visible when said computer is closed, and wherein said first docking location is dimensioned to receive said computer only when said computer is closed.

17. A docking station for receiving a portable computer, comprising:
a first docking location dimensioned to receive a portable computer, and at least one additional docking location dimensioned to receive detachable modules which are also capable of being attached to and carried with said computer; and
first docking connectors, positioned to form electrical connections with said portable computer in said first docking location, including
a power connection which provides power to said computer at said first docking location;
data connectors connected to route display signal outputs from said computer to an external display, and to route user input signals from a user input device to said computer, and to provide a data interface to said computer in said first docking location; and
additional docking connectors positioned to form electrical connections to a module in said additional docking location; wherein said additional docking connectors and said data connectors are interconnected to provide a digital data path therebetween.

18. The docking station of claim 17, further comprising a VGA output connector on the exterior of said docking station, connected so that said display signal outputs are routed therethrough.

19. The docking station of claim 17, wherein said first docking location is dimensioned to receive a notebook-sized portable computer.

20. A docking station for receiving a portable computer, comprising:
a first docking location dimensioned to receive said portable computer, and a plurality of additional docking locations each dimensioned to receive one of said modules; and
first docking connectors, positioned to form externally accessible electrical connections with said portable computer in said first docking location, including
a power connection which provides power to said computer at said first docking location;
data connectors connected to route display signal outputs from said computer to an external display, and to route user input signals from a user input device to said computer; and
additional docking connectors positioned to form electrical connections between said additional docking connectors and a module in one of said additional docking locations.

21. The docking station of claim 20, wherein said first docking location is dimensioned to receive a notebook-sized portable computer.

22. A method of docking a portable computer to user-interface hardware, comprising the steps of:
(a.) inserting the computer into a body including therein a first docking location dimensioned to receive the computer; wherein first docking connectors are positioned in said body to mate with said computer in said first docking location; and
(b.) after said step (a.), routing display signal outputs from said computer to an external display, through first docking connectors and complementary interface connectors, and routing user input signals from an external user input device to said computer, through said first docking connectors; and
(c.) inserting at least one detachable module, which is also capable of being inserted into said computer, into at least one additional docking location in said body which includes additional docking connectors which mate with said module; and
(d.) after said steps (a.) and (c.), performing data communication in at least one direction between the module and the computer through said first docking connectors and said additional docking connectors.

23. The method of claim 22, wherein said step (b.) routes said display signal outputs through a VGA output connector on the exterior of said body.

24. The method of claim 22, wherein said computer is a notebook-sized portable computer.

25. A method of docking a portable computer to user-interface hardware, comprising the steps of:
(a.) inserting the computer into a body including therein a first docking location dimensioned to receive the computer; wherein first docking connectors are positioned in said body to mate with said computer in said first docking location; and
(b.) after said step (a.), routing display signal outputs from said computer to an external display, through first docking connectors and complementary interface connectors, and routing user input signals from an external user input device to said computer, through said first docking connectors; and
(c.) inserting at least one detachable module, which is also capable of being inserted into and carried with said computer, into at least one additional docking location in said body which includes additional docking connectors which mate with said module; and
(d.) after said steps (a.) and (c.), performing data communication in at least one direction between the module and the computer through said first docking connectors and said additional docking connectors;
wherein said computer includes an integral display which is not visible when said computer is closed; and wherein, in said step (a.), said computer is inserted in a closed position.

26. A method of docking a portable computer to user-interface hardware, comprising the steps of:
(a.) inserting the computer into a body including therein a first docking location dimensioned to receive the computer; wherein first docking connectors are positioned in said body to mate with said computer in said first docking location; and (b.) after said step (a.), routing display signal outputs from said computer to an external display, through first docking connectors and complementary interface connectors, and routing user input signals from an external user input device to said computer, through said first docking connectors;

(c.) inserting first and second detachable modules, which are both also capable of being inserted into said computer, into two additional docking locations in said body which each include respective additional docking connectors which mate with said respective module; wherein said second detachable modules includes a battery;

(d.) after said steps (a.) and (c.), performing data communication in at least one direction between the first detachable module and the computer through said first docking connectors and said additional docking connectors; and (e.) after said step (c.), charging said battery while said second detachable module is positioned in one of said additional docking locations.

27. A method of docking a portable computer to user-interface hardware, comprising the steps of:

(a.) inserting the computer into a body including therein a first docking location dimensioned to receive the computer; wherein first docking connectors are positioned in said body to mate with said computer in said first docking location; and (b.) after said step (a.), routing display signal outputs from said computer to an external display, through first docking connectors and complementary interface connectors, and routing user input signals from an external user input device to said computer, through said first docking connectors;

(c.) inserting first and second detachable modules, which are both also capable of being inserted into and carried with said computer, into two additional docking locations in said body which each include respective additional docking connectors which mate with said respective module; wherein said second detachable modules includes a battery;

(d.) after said steps (a.) and (c.), performing data communication in at least one direction between the first detachable module and the computer through said first docking connectors and said additional docking connectors; and (e.) after said step (c.), charging said battery while said second detachable module is positioned in one of said additional docking locations;

wherein said battery of said second module is charged, during said step (e.), regardless of which of said additional docking locations said second module is inserted into during said step (c.).

28. The method of claim 26, wherein said step (b.) routes said display signal outputs through a VGA output connector on the exterior of said body.

29. The method of claim 26, wherein said computer is a notebook-sized portable computer.

30. A method of docking a portable computer to user-interface hardware, comprising the steps of:

(a.) inserting the computer into a body including therein a first docking location dimensioned to receive the computer; wherein first docking connectors are positioned in said body to mate with said computer in said first docking location; and (b.) after said step (a.), routing display signal outputs from said computer to an external display, through first docking connectors and complementary interface connectors, and routing user input signals from an external user input device to said computer, through said first docking connectors;

(c.) inserting first and second detachable modules, which are both also capable of being inserted into and carried with said computer, into two additional docking locations in said body which each include respective additional docking connectors which mate with said respective module; wherein said second detachable modules includes a battery;

(d.) after said steps (a.) and (c.), performing data communication in at least one direction between the first detachable module and the computer through said first docking connectors and said additional docking connectors, and (e.) after said step (c.), charging said battery while said second detachable module is positioned in one of said additional docking locations;

wherein said computer includes an integral display which is not visible when said computer is closed; and wherein, in said step (a.), said computer is inserted in a closed position.

* * * * *